United States Patent [19]

Rogers

[11] 4,289,178
[45] Sep. 15, 1981

[54] LIQUID PRESSURE CONTROL SYSTEM

[76] Inventor: Bernard T. Rogers, Braes, Ullapool, Ross-shire, Scotland

[21] Appl. No.: 970,344

[22] Filed: Dec. 18, 1978

[30] Foreign Application Priority Data

Dec. 19, 1977 [GB] United Kingdom ............... 52799/77

[51] Int. Cl.³ ............................................. B27L 11/00
[52] U.S. Cl. .............................. 144/188; 144/162 R;
144/326D; 60/539; 60/584
[58] Field of Search ..................... 144/185, 162 R, 42, 144/218, 326 A, 326 C, 326 D, 188; 241/277, 279, 280; 60/539, 584

[56] References Cited

U.S. PATENT DOCUMENTS

| | | | |
|---|---|---|---|
| 2,349,034 | 5/1944 | Elmendorf | 144/326 D |
| 2,689,092 | 9/1954 | Clark et al. | 144/326 D |
| 2,712,842 | 7/1955 | Fahrni | 144/326 C |
| 3,162,222 | 12/1964 | Kirsten | 144/326 C |
| 4,148,345 | 4/1979 | Rogers | 144/326 D |

FOREIGN PATENT DOCUMENTS 866313 4/1961 United Kingdom .

Primary Examiner—W. D. Bray
Attorney, Agent, or Firm—Ostrolenk, Faber, Gerb & Soffen

[57] ABSTRACT

A liquid pressure control system for advancing logs (19) towards a rotary cutter wheel (10) in timed relationship to successive cuts by cutters on that wheel (10). A cam arrangement (52) on the cutter wheel (10) actuates jerk pumps (71 and 72) to dispense hydraulic fluid to hydraulic rams (33 and 34) in the timber feed mechanism (18).

15 Claims, 11 Drawing Figures

LIQUID PRESSURE CONTROL SYSTEM

This invention relates to liquid pressure control systems for effecting advance of a slave member in steps along a path in a timed relationship with a succession of discrete actions by a master device.

An object of this invention is to provide a liquid pressure control system which, among other applications, is suitable for use to control the operation of a timber feed mechanism of a wood wool production machine so that, after each cut, timber stock is advanced automatically towards cutters of the machine by a step equal to the thickness of that cut so that the timber stock is positioned for the next cut.

According to this invention there is provided a liquid pressure control system for effecting advance of a slave member in steps along a path in a timed relationship with a succession of discrete actions by a master device, comprising at least one pump and a liquid pressure operable slave actuator device which has a movable part by which the slave member is carried; the or each pump comprising a housing, a pump chamber formed in the housing, a liquid displacer housed movably within the pump chamber; a liquid pressure inlet which is for connection to a source of liquid pressure and which is arranged within the pump housing such that liquid pressure can be drawn into the pump chamber from said source by movement of the displacer, and a liquid pressure outlet which is in communication with a space of the slave actuator device and through which liquid is displaced under pressure from within the pump chamber to said space by movement of the displacer; and control means which are responsive to said succession, which control the position of said displacer within the pump chamber and which are adapted to move said displacer within the chamber in synchronism with said succession so as to displace from the pump chamber to the space of the slave actuator device a volume of liquid sufficient to effect a step of the slave member in a timed relationship with an action of said succession and to refill the pump chamber between each such displacement.

The control means may comprise a cam arrangement, including cam driving means adapted to drive a cam in synchronism with said succession, the liquid displacer being associated with a cam follower which co-operates with the cam to govern the location of the displacer within the chamber.

Preferably means are provided for preventing reverse movement of the slave member whilst the pump chamber is being refilled and such means may comprise a one-way valve between the pump chamber and said space to prevent backflow of liquid from said space to the pump chamber. Hence, where the system is used to control the operation of a timber feed mechanism of a wood wool production machine, the necessary reaction to forces applied to the timber stock by the cutters during a cut is provided by the system.

Preferably the or each pump is provided with control means which determine a proportional relationship between the volume of the pump chamber and the volume of liquid that is displaced from the chamber by the displacer for each cycle of operation of the pump, such control means being adjustable so that the length of each step of the stepwise advance of the slave member can be adjusted.

In practice the or each pump is arranged such that liquid is displaced from the pump chamber through the liquid pressure outlet by the displacer at a pressure which is greater than the pressure at which the liquid is drawn into the pump chamber through the liquid pressure inlet. A particularly suitable form of pump for this purpose is that commonly used as a diesel engine fuel pump and which is known as a "jerk pump".

Conveniently, where there is more than one pump, the space of the slave actuator device may be connected in parallel to the liquid pressure outlets of two of the pumps, the cam arrangement being adapted to operate the two pumps alternately. The control system may be arranged to effect stepwise advance of a plurality of slave members, the advance of each slave member being in timed relationship with a respective succession of discrete actions by a common master device, each slave member being carried by a movable part of a respective liquid pressure operable slave actuator device which has its space in communication with the liquid pressure outlet of the respective one or more of the pumps, and the cam arrangement being associated with the displacers of all pumps.

One form of liquid pressure control system in which this invention is embodied is incorporated in a wood wool production machine which includes a rotary cutter wheel mounted for rotation about a vertical axis and carrying blades for cutting wood wool from timber stock, and timber stock feed means for feeding timber stock towards the wheel along a path which is radial to the wheel, wherein the control system controls advance of timber towards the wheel in synchronised succession with the action of blades of the cutter wheel to remove wood wool from the stock. The wood wool production machine may include a bridge casing which bridges the cutter wheel and carries the or each pump and the source of liquid pressure. Conveniently the bridge casing comprises two pillar portions and a central portion, the source of liquid pressure comprising a driven pump which is driven to draw liquid from a liquid reservoir which is located within the interior of a hollow one of the pillar portions. Where the control means comprise a cam arrangement, that cam arrangement may be located within a chamber which is formed at the centre of the central bridge portion and is mounted on a shaft which also carries the cutter wheel, the or each pump of the control system being mounted in an aperture in the wall of said chamber and the source of liquid pressure being outside the chamber.

One embodiment of this invention will be described now by way of example with reference to the accompanying drawings, of which:

FIG. 1 comprises a partial circuit diagram of the hydraulic control system of a rotary wood wool production machine installation shown superimposed upon an outline plan of the installation which has one of its four wood feed mechanisms shown fully in plan with its shutter closed and without the respective part of the hydraulic control system, the central part of the hydraulic control system being shown in full, as if a top central inspection cover of the installation had been removed, and the other parts of the system that are shown being shown dotted;

Figure 1:
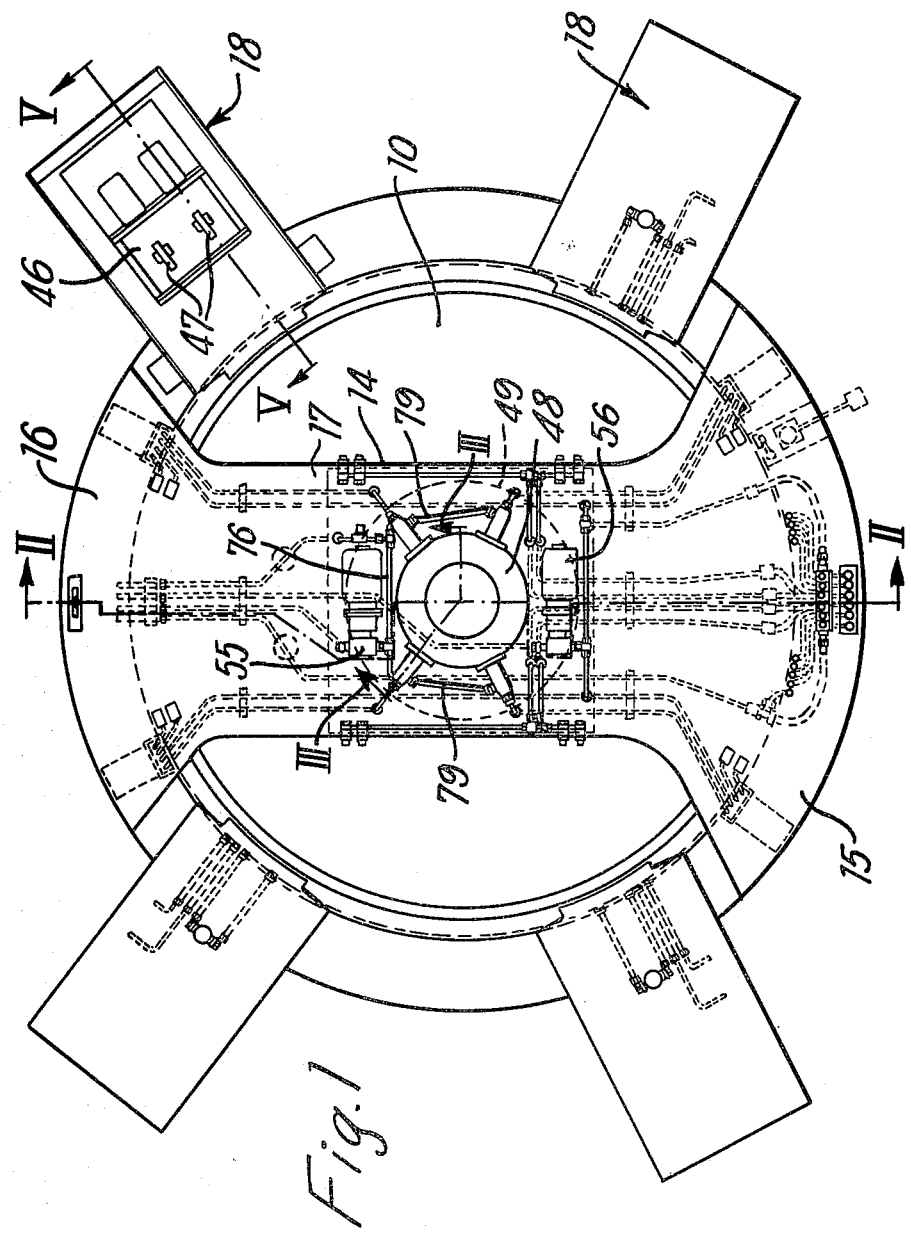

The apparatus shown in the accompanying drawings is an example of the rotary wood wool cutting machine that is described and claimed in my British Patent Specification No. 1509771. It has a cutter wheel 10 which is carried by a vertical shaft 11 and which, in the context of the invention that forms the subject of this specification, is a master device. A rotary drive mechanism (not shown) is drivingly coupled to the shaft 11 below the wheel 10. The wheel 10 has a frusto-conical annular rim 12 at its outer periphery. Apertures 13 (see FIGS. 8 and 10) are formed in the rim 12 at equiangularly spaced locations. A planing blade is mounted in alternate apertures 13 and a group of scoring blades are mounted in each of the intermediate apertures 13 so that their cutting edges project outwardly from the respective aperture 13 proud of the frusto-conical outer surface of the rim 12. The scoring blades in each aperture 13 are located with respect to the cutting edge of the planing blade that is mounted in the aperture 13 that follows that aperture 13 during rotation of the wheel 10 so that they score the surface of timber to be cut before that scored surface layer is shaved from the timber by the planing blade. The resultant strands of wood wool that are formed by shaving the scored surface layer from timber stock by the planing blade mounted in each aperture 13 are directed towards the centre of the cutter wheel 10 through the respective aperture 13.

A hollow bridge casing 14 extends substantially diametrically across the cutter wheel 10 and comprises a pair of pillar portions 15 and 16 and a central portion 17 which joins them together. Each pillar portion 15 and 16 is segmentally shaped, as seen in plan, and the central bridge portion 17 is parallel sided. The distance between the parallel sides of the central bridge portion 17 is less than the radius of the wheel 10 and is approximately half the maximum chordal dimension of each segmentally shaped pillar portion 15, 16.

Four feed magazines 18 for feeding logs 19 of timber onto the frusto-conical outer face of the annular rim 12 of the wheel 10 are mounted in pairs symmetrically on either side of the bridge casing 14. The longitudinal axis of each feed magazine 18 extends substantially radially with respect to the wheel 10. Each pair of magazines 18 project into the respective bight formed on the adjacent side of the bridge casing 17 by the edges of the pair of pillar portions 15 and 16 and are spaced from one another angularly.

Figure 8:
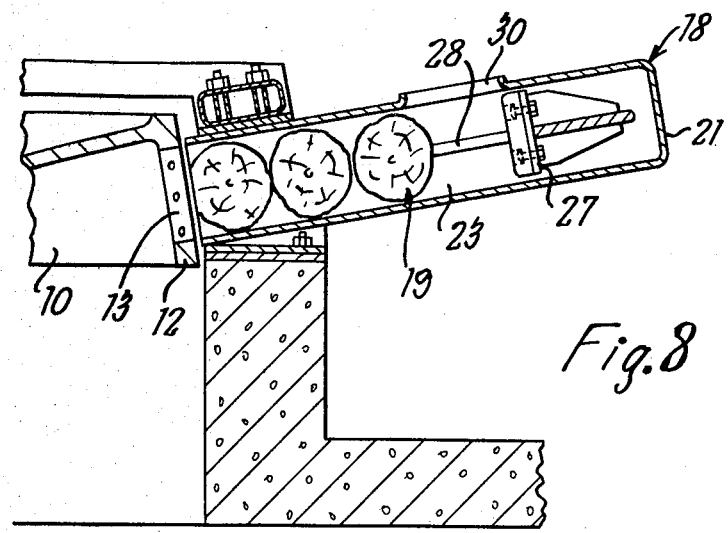
FIG. 8 is a somewhat simplified diagrammatic smaller scale version of the view of a typical feed magazine which is shown in FIG. 5 and shows logs in position within the feed magazine.
Figure 9:
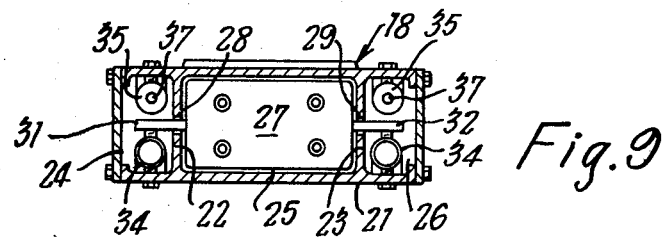
FIG. 9 is a section on the line IX—IX in FIG. 8.
Figure 10:
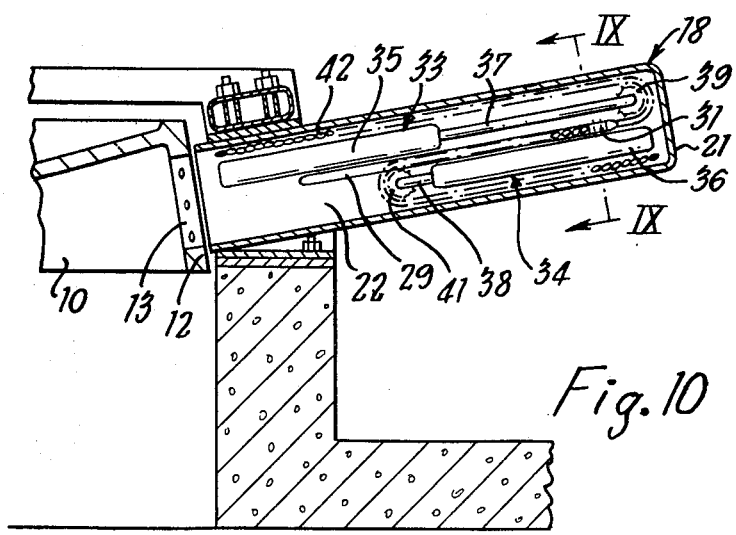
FIG. 10 is a side view of the feed magazine shown in FIG. 8 with the side wall removed.

The four feed magazines 18 are substantially identical and the construction of a typical one of them will be described now by way of example with particular reference to FIGS. 8 to 10.

The typical feed magazine 18 comprises a housing 21 which is divided by a pair of vertical divider walls 22 and 23 into three box sectioned compartments 24, 25 and 26 which are arranged side-by-side and which extend from end to end of the magazine 18. The vertical divider walls 22 and 23 are disposed symmetrically about the longitudinal axis of the magazine 18 and are substantially parallel to that axis. The feed magazine 18 is open at its radially inner end which is adjacent the frusto-conical outer face of the annular rim 12.

The central one 25 of the three compartments is designed to accommodate the logs 19 and contains a pusher plate 27 which is for pushing such logs 19 towards the cutter wheel 10 and which, in the context of the invention that forms the subject of this application is a slave member. Each divider wall 22, 23 has one elongate slot 28, 29 formed centrally in it. Each slot 28, 29 extends over a major part of the length of the respective wall 22, 23. An aperture 30 is formed in the upper wall of the central compartment 25.

An arm 31, 32 projects laterally from either side of the pusher plate 27 through the respective slot 28, 29 into the adjacent side compartment 24, 26 where it is fixed to a respective hydraulic drive mechanism which is housed in that compartment 24, 26. The hydraulic drive mechanisms housed in the side compartments 24 and 26 are substantially identical and a typical one of them will be described now with reference to FIG. 10. It comprises a pair of single acting hydraulic rams 33 and 34. Each ram 33, 34 comprises a ram cylinder 35, 36 and a ramrod 37, 38 which projects from the ram cylinder 35, 36 and is movable axially relative to the ram cylinder 35, 36 by the action of fluid pressure in that ram cylinder 35, 36. Each ramrod 37, 38 carries a sprocket 39, 41 at its outer end. The ram 33 is supported from the upper wall of the housing 21. The other ram 34 is mounted on the lower wall of the housing 21. The ram cylinder 35 of the upper ram 33 is adjacent to the radially inner end of the magazine housing 21 and the sprocket 39 of that ram 33 is nearer to the radially outer end of the housing 21. The lower ram 34 has its ram cylinder 36 adjacent to the radially outer end of the housing 21 and its sprocket 41 nearer the radially inner end of the housing 21.

A heavy duty roller chain 42 is fixed at one end to the upper wall of the housing 21 and extends from that location away from the wheel 10, around the sprocket 39, back towards and around the other sprocket 41 and then outwards again to its other end which is fixed to the lower wall of the housing 21 adjacent the radially outer end of the housing 21.

Each arm 31, 32 is fixed to that part of the respective chain 42 that runs between the two sprockets 39 and 41 within the respective side compartment 24, 26. Hence as one of the rams 33, 34 in each side compartment 24, 26 extends the other of those two rams 33 and 34 contracts so that the two ramrods 37 and 38 move together in the same direction carrying the respective arm 31, 32 of the pusher plate 27 with them. Each ram cylinder 35, 36 has a liquid pressure port which is not shown.

Figure 5:
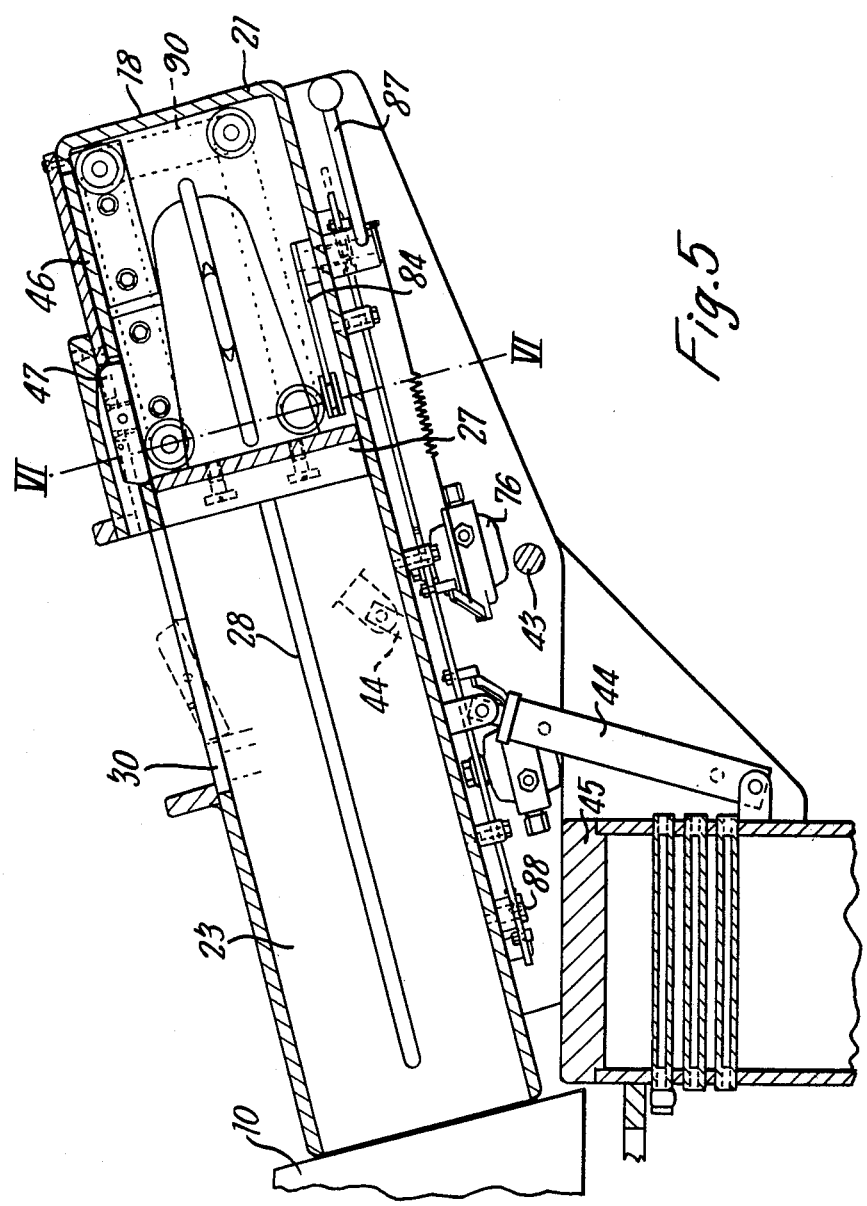
FIG. 5 is drawn to a larger scale than FIG. 1 and is a section of part of the installation shown in FIG. 1 which includes a typical feed magazine, the section being on the line V—V of FIG. 1 and the shutter of the feed magazine being shown open.
Figure 6:
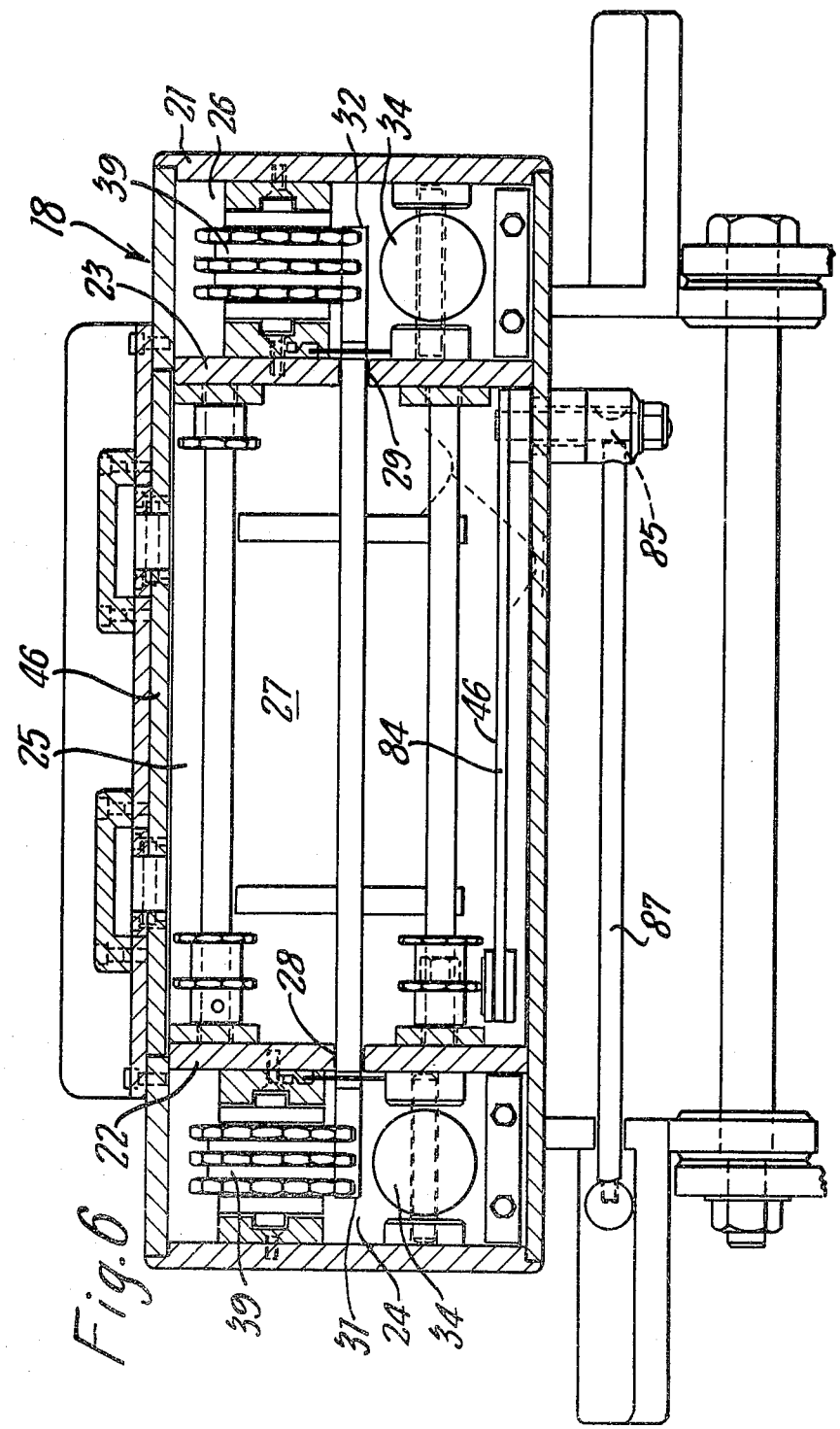
FIG. 6 is a section on the line VI—VI in FIG. 5.

FIG. 5 shows that the feed magazine 18 is mounted pivotally upon a fixed pivot pin 43. An hydraulic jack 44 is provided for swinging the feed magazine 18 about the fixed pivot pin 43 between the operational position shown in full lines in FIG. 5 and another position which is indicated in FIG. 5 by a dotted illustration of the hinged joint between the jack 44 and the housing 21 and in which the feed magazine 18 is displaced from the wheel 10 to allow access to the wheel 10. The feed magazine 18 is locked in its operational position shown in FIG. 5 where it rests upon the upper surface of a support block 45 which is located between the fixed pivot pin 43 and the wheel 10. The jack 44 is fully retracted when the feed magazine 18 rests upon the support block 45.

A shutter 46 is provided for closing the aperture 30. The shutter 46 carries two pawls 47. The end of each pawl 47 nearer the wheel 10 projects into the central compartment 25 when the shutter 46 is positioned to close the aperture 30 as is shown in FIG. 1 and dotted in FIG. 5. The upper wall of the magazine 18 has two arched openings with curved inner surfaces. Each pawl 47 is received in a respective one of the arched openings, when the shutter 46 is open, and is deflected by its engagement with the curved inner surface so that it is held out of the path of the pusher plate 27.

Figure 2:
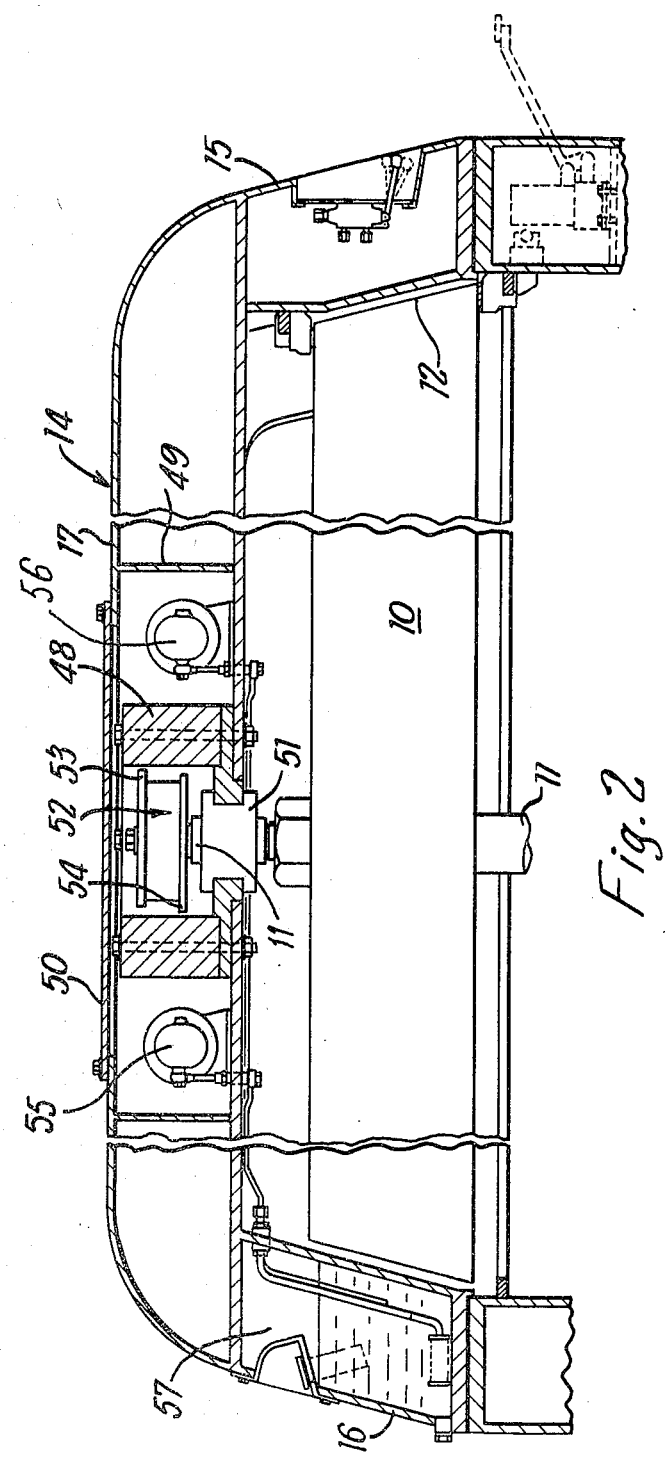
FIG. 2 is a cross-section drawn to a larger scale than is FIG. 1 and with parts broken away, of the upper part of the installation that is illustrated in FIG. 1, the section being on the line II—II in FIG. 1.

FIG. 2 shows that a circular chamber is formed at the centre of the central portion 17 of the hollow bridge casing 14 by a right cylindrical wall 48. An outer cylindrical wall 49 surrounds the cylindrical wall 48 coaxially so that an annular chamber is formed between the two cylindrical walls 48 and 49. An aperture in the upper wall of the central portion 17 extends over both the circular chamber and the annular chamber and is closed by a removable inspection cover 50.

The shaft 11 projects above the wheel 10 into the circular chamber that is formed within the cylindrical wall 48. The shaft 11 is journaled in a bearing 51 which is mounted at the centre of the bottom wall of the central portion 17 of the hollow bridge casing 14.

A double cam 52 is fixed to the upper end of the shaft 11 for rotation with the shaft 11 within the central chamber, one of the profiled cam surfaces 53 of the double cam 52 being above the other 54 profiled cam surface.

Two motor driven pumps 55 and 56 are mounted within the annular chamber that is formed between the inner and outer cylindrical walls 48 and 49. The pumps 55 and 56 are adapted to be driven continuously whenever the apparatus is in operation.

The pillar portion 16 is hollow and the chamber formed by it serves as a liquid reservoir 57.

Figure 3:
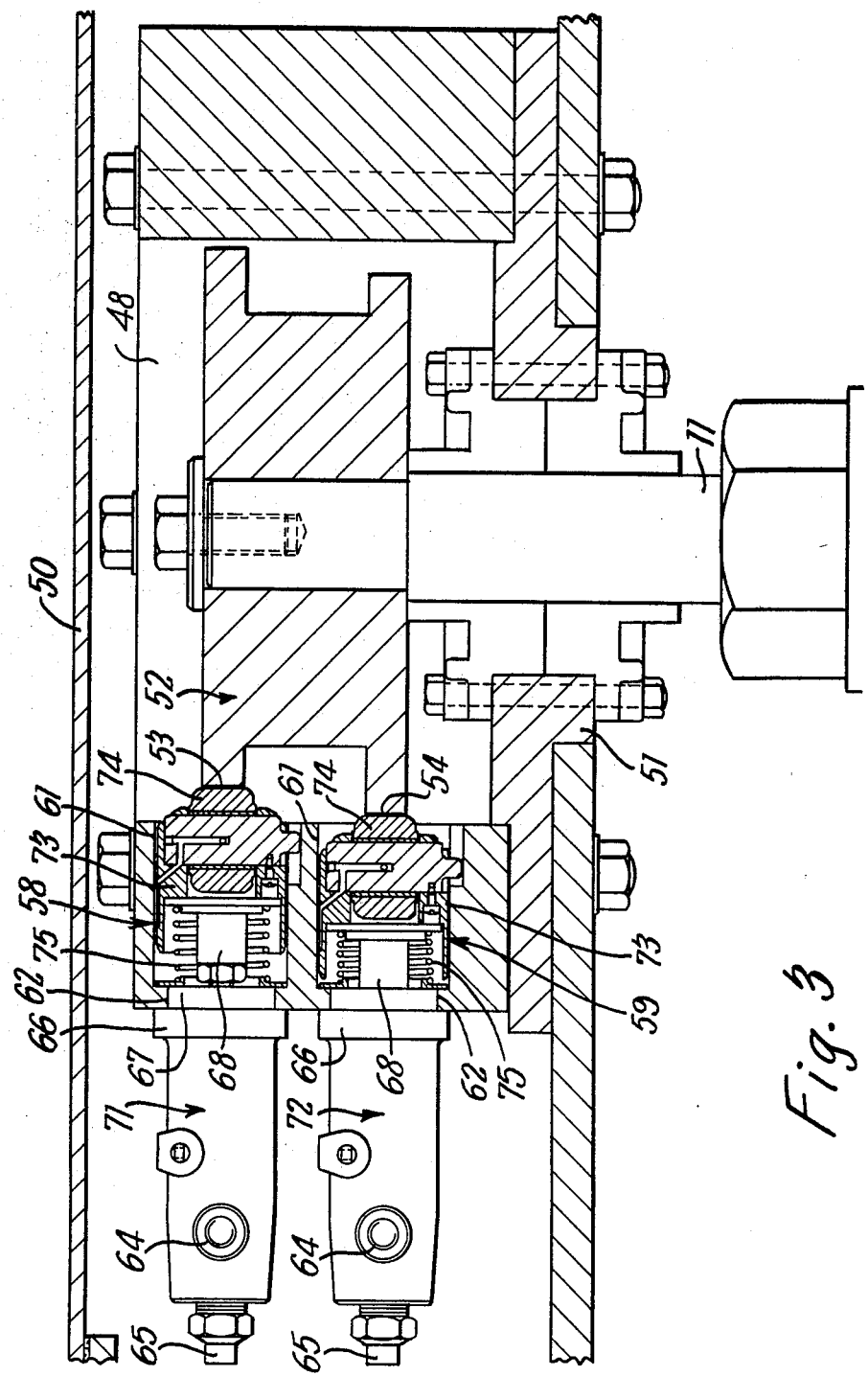
FIG. 3 is a fragmentary section of the installation drawn on the line III—III of FIG. 1 to a somewhat larger scale than FIG. 2.
Figure 4:
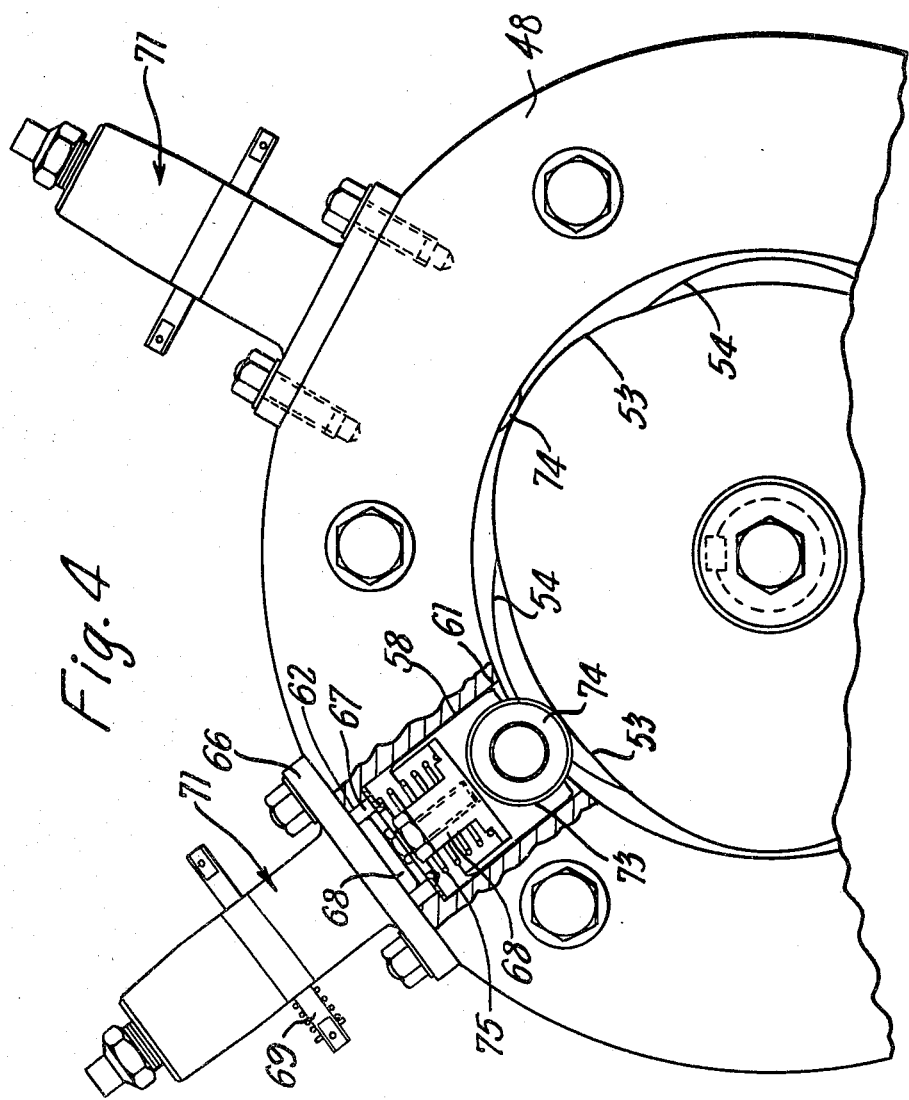
FIG. 4 is a partly sectioned fragmentary plan view of FIG. 3 with the top inspection cover removed.

Referring now to FIGS. 3 and 4, there are eight two diameter stepped through bores formed in the right cylindrical wall 48. Four of those bores are spaced from one another angularly and are located such that their longitudinal axes all lie in a horizontal plane which passes through the upper profiled cam surface 53. Only one, 58 of these four bores is shown in FIGS. 3 and 4 but the location of the other three will be apparent to the reader. Each of the other four through bores 59 is directly below a corresponding one of the four upper through bores 58 and the axes of the four lower through bores 59 all lie in a horizontal plane which passes through the lower profiled cam surface 54. The axis of each of the two diameter stepped through bores 58,59 and the axis of the vertical shaft 11 intersect. The larger diameter bore portion 61 of each through bore 58,59 extends from the inner end of that bore 58, 59 for a major part of the overall length of that bore 58, 59. The smaller diameter bore portion 62 of each two diameter stepped through bore 58, 59 extends to the outer end of that through bore 58, 59.

Eight liquid pumps of the kind commonly used as diesel engine fuel pumps and which are known as "jerk pumps" are mounted in the right cylindrical wall 48 such that they project radially outwardly from the outer surface of that wall 48.

Each jerk pump has a liquid pressure inlet 64 between its ends, a liquid pressure outlet 65 at one end, a mounting flange 66 adjacent to but spaced from the other end and a tubular spigot 67 which projects from the mounting flange 66 towards that other end. An actuator plunger 68 slides within a bore in the body of the pump, abuts the master piston (not shown) of the pump and projects from the bore of the tubular spigot 67. There is a control linkage 69 which is adapted to be connected to the calibrating linkage when the pump is used as a diesel engine fuel pump and which is arranged to be operated to vary the proportion of the total capacity of the pump volume that is displaced through the outlet 65 of the pump by a single operation of the pump. Each of the smaller diameter bore portions 62 of the four upper two diameter stepped bores 58 receives the tubular spigot 67 of a respective one of the four upper pumps 71 and each of the smaller diameter end bore portions 62 of the other four two diameter stepped through bores 59 receives the tubular spigot 67 of each of the four lower pumps 72. A pump tappet 73, which slides within each larger diameter bore portion 61, is connected to the actuator 68 of the pump 71, 72 that has its tubular boss 67 spigotted into the respective smaller diameter bore portion 62 and carries a roller type cam follower 74. Each pump tappet 73 is urged towards the respective upper or lower profiled cam surface 53, 54 by a respective tappet return coil spring 75 which reacts against the respective tubular boss 67. Hence the roller type cam followers 74 are held against the respective upper or lower profiled cam surface 53, 54.

Figure 11:
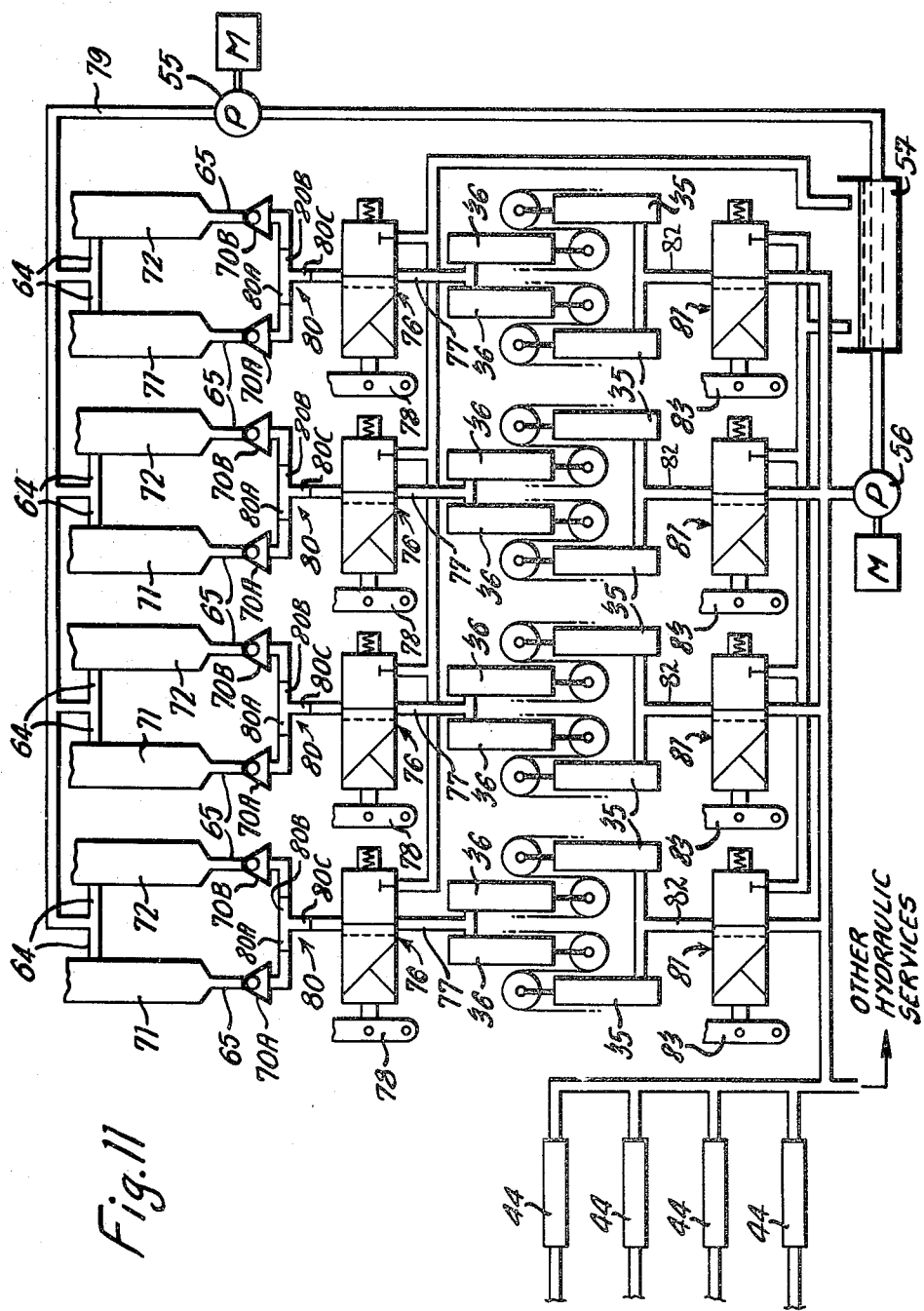
FIG. 11 is a diagram illustrating the hydraulic control system of the machine installation shown in FIG. 1.

FIG. 11 shows that the liquid pressure outlet 65 of each upper pump 71 is connected through a non-return valve 70A to a respective branch 80A of a respective/equalising T-junction 80, the liquid pressure outlet 65 of the lower pump 72 that is directly below that upper pump 71 is connected through another non-return valve 70B to the other inlet branch 80B of that T-junction 80. The single outlet 80C of each T-junction 80 is connected to an inlet of a respective control valve 76 which is mounted upon the underside of the respective one of the four magazines 18. Each control valve 76 has two outlets. One of the outlets is connected in parallel via a branched conduit 77 (see FIG. 7) to the fluid pressure ports of the two lower ram cylinders 36 of the respective magazine 18. The other outlet is connected to the liquid reservoir 57. Each valve 76 is arranged either to connect its inlet to the said one outlet and to isolate them from its other outlet (as shown in FIG. 11) or to connect them both to said other outlet in accordance with the setting of a respective control lever 78.

The motor driven pump 55 has its liquid pressure inlet in communication with the liquid reservoir 57 and its liquid pressure outlet connected, via suitable piping 79, to the liquid pressure inlets 64 of each of the four upper pumps 71 and of each of the four lower pumps 72.

The other motor driven pump 56 has its liquid pressure inlet in communication with the interior of the liquid reservoir 57 and its liquid pressure outlet connected to various other hydraulic services, for example the hydraulic jacks 44 and the upper ram cylinders 35 of each of the feed magazines 18. Supply of liquid pressure by the pump 56 to each upper ram cylinder 35 is controlled by a second control valve 81 which is mounted upon the underside of the respective feed magazine 18.

Each second control valve 81 has two outlets. One of the outlets is connected in parallel via a branched conduit 82 (see FIG. 7) to the fluid pressure ports of the two upper ram cylinders 35 of the respective magazine 18. The other outlet is connected to the liquid reservoir 57. Each valve 81 is arranged to connect its inlet to the said one outlet and to isolate them from its other outlet (as shown in FIG. 11) or to connect them both to said other outlet in accordance with the setting of a respective control lever 83.

Figure 7:
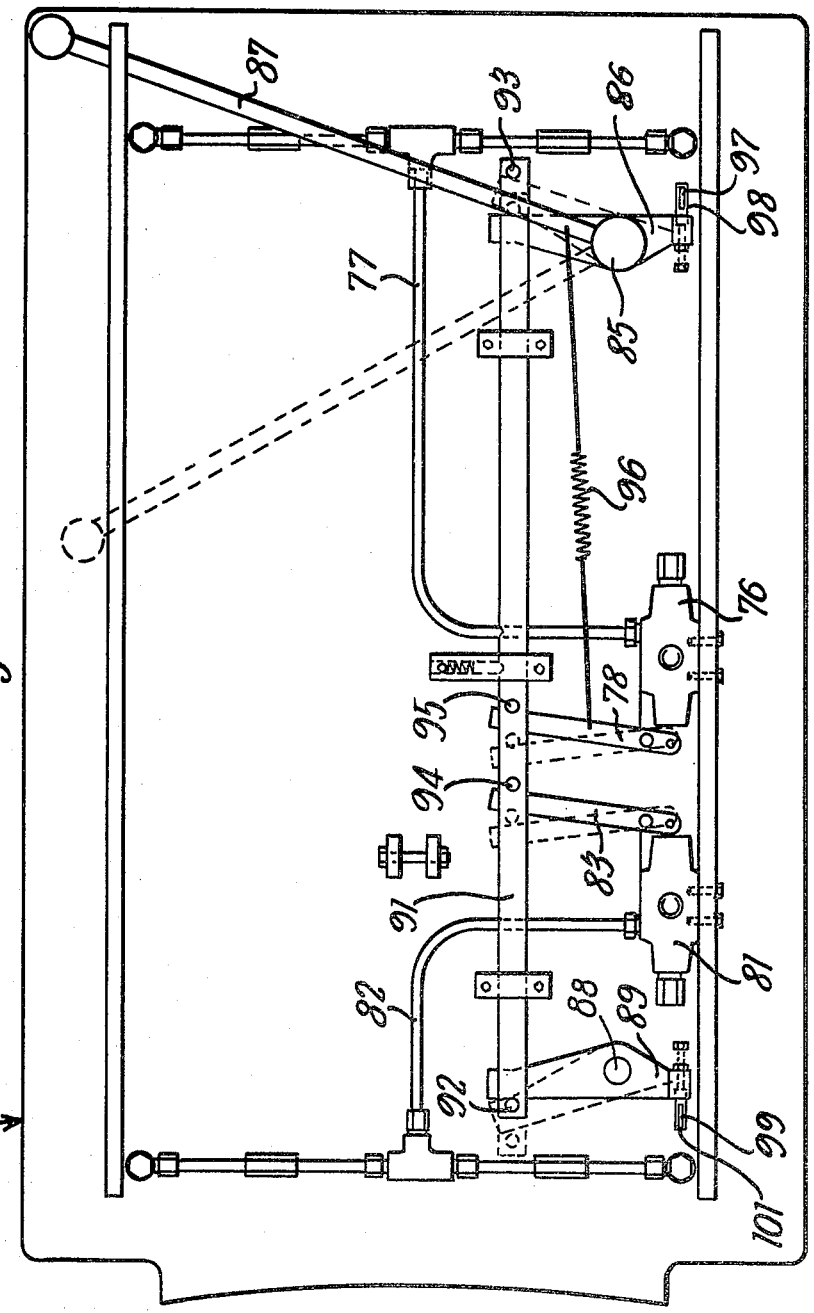
FIG. 7 is an underneath plan of a typical feed magazine and control gear fitted therebelow.

FIG. 5 shows that an arm 84 is mounted pivotally within the central compartment 25 of each feed magazine 18 between the pusher plate 27 and the radially outer end of the housing 21 of that magazine 18. The pivot pin 85 of each arm 84 projects through and is journaled within the lower wall of the respective housing 21. FIG. 7 shows that each arm 84 is rigidly connected to a lever 86 which is pivotally mounted about the same pivot pin 85 and which is located below the bottom wall of the respective housing 21. A hand lever 87 is pivoted upon the pivot pin 85 as well and is pivotable relative to the lever 86. The arm 84 is connected to a chain 90 (see FIG. 5) which is connected to the shutter 46 so that the arm 84 and the chain 90 move together with opening and closing movement of the shutter 46. A lever 97 is mounted pivotally within the central compartment 25 of each feed mechanism and projects through an aperture 98 in the bottom of the compartment 25 so that it extends past the lever 86.

A second lever 99 is mounted pivotally within the central compartment 25 of each feed magazine 18 adjacent the open radially inner end of the housing 21 of that magazine 18. The pivot pin 88 of each second lever 99 projects through and is journaled within the lower wall of the respective housing 21 and carries a lever 89 which is located below that bottom wall. The lever 99 projects through an aperture 100 in the bottom of the compartment 25 past the lever 89.

Each feed magazine 18 has a bar 91 which is supported parallel to the longitudinal axis of the housing 21 below its bottom wall for lengthwise rectilinear movement. The bar 91 has a peg 92, 93 at either end and another pair of pegs 94 and 95 between its centre and the peg 92 that is at the end nearer to the open radially inner end of the housing 21.

FIG. 7 shows that the control lever 83 and the lever 89 both extend between the pegs 92 and 94, the lever 89 being adjacent the peg 92 and the lever 83 adjacent the peg 94. The control lever 78 extends between the pegs 94 and 95, being adjacent the peg 95, and the lever 86 extends between the pegs 95 and 93, being adjacent the end peg 93. A resilient link 96, which includes a tension spring, extends between the control lever 78 and the hand lever 87.

To initiate a wood wool cutting operation when the apparatus is ready for use, the central compartment 25 having been charged with logs 19 through the aperture 30, the hand lever 87 of each feed magazine 18 is swung manually to the position shown in full in FIG. 7 so that the shutter 46 is moved to close the aperture 30 by the chain 90 that connects it to the arm 84, the bar 91 of each feed magazine 91 being at the end of its stroke furthest from the radially inner open end of the respective housing 21 as shown in full in FIG. 7. Such movement of the hand lever 87 is followed by movement of the control lever 78, due to the resilience of the spring 96, so that each control lever 78 is held in the position shown in full in FIG. 7. Consequently, the control valves 76 are set to connect their inlets to their outlets that are connected via the respective branched conduits to the fluid pressure ports of the lower rams 34, and to isolate them from the liquid reservoir 57 and the second control valves 81 are set to connect their inlets and their outlets that are connected via the respective branch conduits 82 to the fluid pressure ports of the upper rams 35 to the liquid reservoir 57 as is shown in FIG. 11.

The cutter wheel 10 is driven and the double cam 52 rotates with it. The roller cam followers 74 follow the respective profiled cam surfaces 53 and 54. The consequent radially oscillating movement of each cam follower 74 is transmitted to the displacer of each pump 71, 72 by the respective pump tappet 73. Hence, the pumps 71 and 72 of each vertically spaced pair alternately displace a measured volume of liquid through the respective non-return valve 70A, 70B, T-junction 80 and the respective control valve 76 to the respective pair of lower rams 36 which extend and advance the respective pusher plate 27 towards the wheel 10.

The volume of liquid displaced by each pump 71, 72 for each radial oscillation of the respective cam follower 74 is determined by the setting of the control linkage 69 and is set to be that required to advance the pusher plate 27 by a distance equal to the depth of cut made by the group of blades mounted in each aperture in the wheel 10. The double cam 10 is arranged such that, just after one cut by the planing blade in one of the apertures of the wheel 10 (viz. one action in the succession of cutting actions by the master device), the pusher plate 27 is advanced by liquid displaced by operation of one of the respective pair of pumps 71 and 72, whereafter scores are formed in the timber stock by the scoring cutters in the next aperture of the cutter wheel 10 and a further cut is made by the planing blade in the next but one aperture, and the pusher plate 27 is then advanced further by liquid displaced by operation of the other of the respective pair of pumps 71 and 72, and so on. Liquid is drawn into each pump chamber by the return stroke of the displacer of each pump 71, 72 after the displacement from the pump chamber of a volume of liquid sufficient to effect the advance of the pusher plate 27 by a distance equal to the thickness of the cut made by the planing cutters in each alternate aperture of the wheel 10.

When the timber stock in each feed magazine 18 is exhausted and the pusher plate 27 approaches the open radially inner end of the housing 21 of that feed magazine 18, the pusher plate engages the respective lever 99 and deflects it so that it in turn deflects the adjacent lever 89 anti-clockwise as seen in FIG. 7. Hence each bar 91 is transferred to the end of its stroke nearest the open radially inner end as shown dotted in FIG. 7. The levers 78 and 83 are deflected by the respective pegs 94 and 95 to the position shown dotted in FIG. 7. The consequent change in the loading on each of the control levers 78 results in each of the control valves 76 changing its state to connect its inlet and its outlet that is connected via the respective branched conduit 77 to the fluid pressure port of the respective lower rams 34 to the liquid reservoir 57. Also each second control valve 81 is set to connect its inlet to its outlet that is connected via the respective branched conduit 82 to the fluid pressure port of the respective upper rams 33. The hand lever 87 remains in the location shown in full in FIG. 7, the spring 96 being extended.

Hence the upper rams 33 are extended moving the respective pusher plate 27 away from the wheel 10. Each pusher plate 27 engages the pawls 47 pushing the shutter 46 in the opening direction. Opening movement of each shutter 46 is followed by movement of the hand lever 87 to the location shown dotted in FIG. 7 due to the connection formed by the chain 90 and the arm 84. When the pusher plate 27 reaches its outermost position, the shutter 46 is open and the hand lever 87 is in the position shown dotted in FIG. 7 so that the mechanism 18 is inoperative because the spring 96 is relaxed. Logs 19 of timber are loaded into each magazine central compartment 25 as shown in FIG. 8. When the central compartments 25 are filled, the apparatus is ready for use again.

The distance advanced by each pusher plate 27 after each cut is made by cutters carried by the cutter wheel 10 can be altered to compensate for cutter wear by adjustment of the pump control linkage 69.

A liquid pressure control system including a cam actuated jerk pump adapted to actuate a liquid pressure operable slave actuator device to effect advance of a slave member in steps in a timed relationship with a succession of discrete actions by a master device, is not limited in its application to incorporation in a wood wool production machine as described above. Such a system may be used to form the basis of mechanical test apparatus. Also it has many applications in connection with machines, machine tools, index mechanisms both plane and varying incremental, variable geometry drives, and controlled jacking systems. The important features of the jerk pump are its capabilities to provide an infinitely variable output and to be operated at infinitely variable speeds, these characteristics being variable independently of one another.

I claim:

1. A liquid pressure control system for effecting advance of a slave member in steps along a path in a timed relationship with a succesion of discrete actions by a master device, comprising at least one pump and a liquid pressure operable slave actuator device which has a movable part by which the slave member is carried; said pump comprising a housing; a pump chamber formed in the housing, a liquid displacer housed movably within the pump chamber, a liquid pressure inlet connectable to a source of liquid pressure and which is arranged within the pump housing such that liquid pressure can be drawn into the pump chamber from said source by movement of the displacer, and a liquid pressure outlet which is in communication with a space of the slave actuator device and through which liquid is displaced under pressure from within the pump chamber to said space by movement of the displacer; and control means responsive to said succession to control the position of said displacer, said control means being adapted to move said displacer within the chamber in synchronism with said succession to displace from the pump chamber to the space of the slave actuator device a volume of liquid sufficient to effect a step of the slave member in a timed relationship with an action of said succession, whereby the slave member is positioned at a new location on said path for the next discrete action of said succession so that a predetermined spatial relationship between the master device and the slave member is established before each action of said succession and after the previous action of said succession, and to refill the pump chamber between each such displacement.

2. A liquid pressure control system according to claim 1, wherein the control means comprise a cam arrangement, including cam driving means adapted to drive a cam in synchronism with said succession and a cam follower connected to the liquid displacer and cooperating with the cam to govern the location of the displacer within the chamber.

3. A liquid pressure control system according to claim 1, wherein means are provided for preventing reverse movement of the slave member whilst the pump chamber is being refilled.

4. A liquid pressure control system according to claim 3, wherein said means for preventing reverse movement of the slave member comprise a one-way valve between the pump chamber and said space to prevent backflow of liquid from said space to the pump chamber.

5. A liquid pressure control system according to claim 1, wherein said pump is provided with control means which determine a proportional relationship between the volume of the pump chamber and the volume of liquid that is displaced from the chamber by the displacer for each cycle of operation of the pump, such control means being adjustable so that the length of each step of the stepwise advance of the slave member can be adjusted.

6. A liquid pressure control system according to claim 1, wherein said pump is arranged such that liquid is displaced from the pump chamber through the liquid pressure outlet by the displacer at a pressure which is greater than the pressure at which liquid is drawn into the pump chamber through the liquid pressure inlet.

7. A liquid pressure control system according to claim 6, wherein said pump is a pump of the form that is that commonly used as a diesel engine fuel pump and which is known as a "jerk pump".

8. A liquid pressure control system according to claim 2, where there is more than one pump, wherein the said space of the slave actuator device is connected in parallel to the liquid pressure outlets of two of the pumps, the cam arrangement being adapted to operate the two pumps alternately 9. A liquid pressure control system according to claim 2, in which the slave member is one of a plurality of slave members and the control system is operable to effect the advance of each slave member in timed relationship with said succession of discrete actions by the master device, wherein each slave member is carried by a movable part of a respective liquid pressure operable slave actuator device which has its cylinder space in communication with the liquid pressure outlet of the respective pump, and the cam arrangement comprises a cam follower for each pump, each cam follower being connected to the liquid displacer of the respective pump and co-operating with the cam to govern the location of the displacer of the respective pump within the chamber of that pump, whereby the cam arrangement governs the location of the displacers of all pumps.

10. A liquid pressure control system according to claim 1 embodied in a wood wool production machine which includes a rotary cutter wheel mounted for rotation about a vertical axis and carrying blades for cutting wood wool from timber stock, and timber stock feed means for feeding timber stock towards the wheel along a path which is radial to the wheel, said system including means whereby the control system controls advance of timber towards the wheel in synchronised succession with the action of blades of the cutter wheel to remove wood wool from the stock.

11. A liquid pressure control system according to claim 10, wherein the wood wool production machine includes a bridge casing which bridges the cutter wheel and carries each of said at least one pump and the source of liquid pressure.

12. A liquid pressure control system according to claim 11, wherein the bridge casing comprises two pillar portions and a central portion, the source of liquid pressure comprising a driven pump which is driven to draw liquid from a liquid reservoir which is located within the interior of a hollow one of the pillar portions.

13. A liquid pressure control system according to claim 11 in which the control means comprise a cam arrangement, including cam driving means adapted to drive a cam in synchronism with said succession, the liquid displacer being operably connected to a cam follower which co-operates with the cam to govern the location of the displacer within the chamber, wherein the cam arrangement is located within a chamber which is formed at the centre of the central bridge portion and is mounted on a shaft which also carries the cutter wheel, each pump of the control system being mounted in an aperture in the wall of said chamber and the source of liquid pressure being outside the chamber.

14. A liquid pressure control system according to claim 12 in which the control means comprise a cam arrangement, including cam driving means adapted to drive a cam in synchronism with said displacement of liquid, the liquid displacer being operably connected to a cam follower which cooperates with the cam to govern the location of the displacer within the chamber, wherein the cam arrangement is located within a chamber which is formed at the centre of the central bridge portion and is mounted on a shaft which also carries the cutter wheel, each pump of the control system being mounted in an aperture in the wall of said chamber and the source of liquid pressure being outside the chamber.

15. Apparatus comprising a master device which is adapted to effect a succession of discrete actions, a slave member which is movable along a path relative to the master device, and a control system which is operable to effect advance of the slave member in steps along the path in timed relationship with said succession whereby thet slave member is positioned at a new location on said path for the next discrete action of said succession so that a predetermined spatial relationship between the master device and the slave member is established automatically after each action of said succession and before the next discrete action of said succession, the control system comprising at least one pump and a liquid pressure operable slave actuator device which has a movable part by which the slave member is carried; each of said at least one pump comprising a housing, a pump chamber formed in the housing, a liquid displacer housed movably within the pump chamber, a liquid pressure inlet which is for connection to a source of liquid pressure and which is arranged within the pump housing such that liquid pressure can be drawn into the pump chamber from said source by movement of the displacer, and a liquid pressure outlet which is in communication with a space of the slave actuator device and through which liquid is displaced under pressure from within the pump chamber to said space by movement of the displacer; and control means which are responsive to said succession, which control the position of said displacer and which are adapted to move said displacer within the chamber in synchronism with said succession so as to displace from the pump chamber to said space of the slave actuator device a volume of liquid sufficient to effect a step of the slave member in a timed relationship with each action of said succession, and to refill the pump chamber between each such displacement.

* * * * *